(12) United States Patent
Chen (10) Patent No.: US 12,399,733 B2
(45) Date of Patent: Aug. 26, 2025

(54) OPERATING SYSTEM DEPLOYMENT DEVICE AND OPERATING SYSTEM DEPLOYMENT METHOD

(71) Applicant: Acer Incorporated, New Taipei (TW)

(72) Inventor: Kuan-Ju Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 487 days.

(21) Appl. No.: 18/057,905

(22) Filed: Nov. 22, 2022

(65) Prior Publication Data

US 2023/0418653 A1 Dec. 28, 2023

(30) Foreign Application Priority Data

Jun. 28, 2022 (TW) ................................. 111124003

(51) Int. Cl.
*G06F 3/00* (2006.01)
*G06F 9/455* (2018.01)
*G06F 9/54* (2006.01)

(52) U.S. Cl.
CPC ...... *G06F 9/45558* (2013.01); *G06F 9/45545* (2013.01); *G06F 9/541* (2013.01); *G06F 9/545* (2013.01); *G06F 2009/4557* (2013.01)

(58) Field of Classification Search
CPC ....................................................... G06F 9/48
See application file for complete search history.

(56) References Cited

U.S. PATENT DOCUMENTS

| 10,705,733 B1 * | 7/2020 | Smaldone ............... G06F 3/067 |
| 10,740,217 B1 * | 8/2020 | Stupachenko ...... G06F 9/45558 |
| 2011/0179418 A1 * | 7/2011 | Takebe .................. G06F 9/5077 718/1 |
| 2019/0265999 A1 * | 8/2019 | Tsirkin ..................... G06F 9/445 |
| 2019/0392117 A1 * | 12/2019 | Viswanathan ........ G06F 21/121 |

FOREIGN PATENT DOCUMENTS

| JP | H07225665 A | * | 8/1995 | |
| JP | 2011060055 A | * | 3/2011 | .......... G06F 11/0712 |

OTHER PUBLICATIONS

Yang Yu, A Feather-weight Virtual Machine for Windows Applications. (Year: 2006).*

* cited by examiner

*Primary Examiner* — Lechi Truong
(74) *Attorney, Agent, or Firm* — McClure, Qualey & Rodack, LLP (57) ABSTRACT

An operating system deployment method includes the following steps. System information is received by a data collector. The system information includes hardware information, window name, and window activation times in the host operating system. The window is opened by a default operating system in a virtual machine, triggering a window opening event so that a virtual image processor in the virtual machine transmits the window opening event to a host operating system kernel. System information is obtained from the data collector by the inference model located in the host operating system kernel. After the system information is input into the inference model, the inference model outputs the inference result, which includes the name of the desktop environment.

16 Claims, 5 Drawing Sheets

```
┌─────────────────────────────────────────┐
│ A plurality of system information is received │
│ by a data collector, the system information │
│ includes hardware information, a window │
│ name of a window and activation times of the │
│ window in a host operating system; the │
│ window is opened by a default operating │──210
│ system in a virtual machine, and a window │
│ open event is triggered, so that a virtual │
│ graphics processing unit in the virtual │
│ machine transmits the window open event to │
│ a host operating system kernel │
└─────────────────────────────────────────┘
                    │
                    ▼
┌─────────────────────────────────────────┐
│ The system information is obtained from the │
│ data collector through an inference model │
│ located in the host operating system kernel, │
│ after the system information is input into the │──220
│ inference model, the inference model outputs │
│ an inference result, the inference result │
│ includes the name of the desktop │
│ environment │
└─────────────────────────────────────────┘
```

OPERATING SYSTEM DEPLOYMENT DEVICE AND OPERATING SYSTEM DEPLOYMENT METHOD

CROSS REFERENCE TO RELATED APPLICATIONS

This application claims priority of Taiwan Patent Application No. 111124003, filed on Jun. 28, 2022, the entireties of which are incorporated by reference herein.

BACKGROUND OF THE INVENTION

Field of the Invention

The present disclosure relates to an operating system deployment device and, in particular, to an operating system deployment device and an operating system deployment method suitable for a hybrid operating system.

Description of the Related Art

A hybrid operating system (Hybrid OS) may be constructed on a virtual environment, such as WSL2 (Windows Subsystem for Linux 2) based on Microsoft operating system 11 (Windows 11), CrosVM of Chrome OS, etc.

A traditional virtual machine (VM) may be slow to boot up, isolated, resource intensive, and consume too much time for users to manage.

Take WSL 2, for example, which uses the latest and best virtualization technology to execute the Linux kernel inside a lightweight utility virtual machine. However, when users use WSL 2 in user mode, they need to decide whether to install distro, or they need to decide what kind of distro to install. Even if users can choose the Linux distro they want, in the corresponding desktop environment, they may not be able to adapt to the hardware specifications of their own electronic devices, resulting in distro using too much system resources after being installed.

Since some of the hardware resources of the device are used by the virtual machine, there is a need for a mechanism to provide an operating system deployment device that meets the consumer groups (i.e., users) and is suitable for current hardware specifications. Automated deployment is suitable for the current hardware specifications and the needs of consumer groups, and has become one of the problems to be solved in this field.

BRIEF SUMMARY OF THE INVENTION

In accordance with one feature of the present invention, the present disclosure provides an operating system deployment device. The operating system deployment device is suitable for a hybrid operating system. The operating system deployment device includes a data collector and an inference model. The data collector is configured to receive a plurality of system information, wherein the system information may include hardware information, the name of a window, and activation times of the window in a host operating system; wherein the window is opened by a default operating system in a virtual machine, and a window opening event is triggered, so that a virtual image processor in the virtual machine transmits the window opening event to a host operating system kernel. The inference model is located in the host operating system kernel. The inference model obtains the system information from the data collector. After the system information is input into the inference model, the inference model outputs an inference result. The inference result includes a desktop environment name, which is the name of the desktop environment.

In one embodiment, the desktop environment comprises a desktop system and a distro, and an application programming interface (API), a service, a daemon, a library or a process management program corresponding to the desktop system and the distro are stored in a storage space.

In one embodiment, the inference model is a trained model.

In one embodiment, during the training phase of the inference model, a plurality of data sets need to be collected, and these data sets are used as a training data set. The data sets collected in the development stage comprise: the window name (which is the name of the window), a window-name category (which is the category of the window name), a distro name (which is the name of the distro), a distro category (which is the category of the distro), and a desktop name. The data sets collected in the manufacturing stage comprise the processor type and the memory size. The data sets collected in the user-scenario stage comprise the window name and the activation times of the window.

In one embodiment, during the training phase of the inference model, these data sets are input into a neural network to train the inference model.

In one embodiment, the part of the data sets collected in the development stage, the part collected in the manufacturing stage, and the part collected in the user-scenario stage are sequentially transmitted back to the server through the transmission interface.

In one embodiment, the desktop environment runs on the virtual machine.

In one embodiment, the desktop environment includes a desktop system and a distro. The default operating system receives the desktop system name (which is the name of the desktop system) and a distro name from the host operating system. The default operating system downloads, from a server, the desktop system corresponding to the desktop system name and the distro corresponding to the distro name.

In one embodiment, when the inference model determines (using a state controller) that there has been a current default operating system deletion event and a new operating system deployment event, a monitoring device collects the processor type, memory size, and new desktop environment name while the new operating system is running. The monitoring device regards the three as an environment combination. The monitoring device increases the environment weight of the environment combination. The monitoring device collects a new window name, new window activation times, and a new window type while running the new operating system. The monitoring device regards the three as a user behavior combination. The monitoring device increases the user behavior weight of the user behavior combination. The monitoring device readjusts the inference model through the environment weight and the user behavior weight, and generates a new inference model.

In one embodiment, a new desktop environment name output by the new inference model is transmitted to the state controller.

In accordance with one feature of the present invention, the present disclosure provides an operating system deployment method. The operating system deployment method includes the following steps. A large amount of system information is received by a data collector. The system information may include hardware information, the name of a window, and the activation times of the window in a host operating system. The window is opened using a default operating system in a virtual machine. A window opening event is triggered, causing the virtual image processor in the virtual machine to transmit the window opening event to a host operating system kernel. The system information is obtained by an inference model located in the host operating system kernel from the data collector. After the system information is input into the inference model, the inference model outputs an inference result. The inference result includes the desktop environment name.

In one embodiment, the desktop environment comprises a desktop system and a distro, and an application programming interface (API), a service, a daemon, a library or a process management program corresponding to the desktop system and the distro are stored in a storage space.

In one embodiment, the inference model is a trained model.

In one embodiment, during the training phase of the inference model, a plurality of data sets need to be collected, and these data sets are used as a training data set. The data sets collected in the development stage comprise: the window name, the window-name category, the distro name, the distro category, and the desktop name. The data sets collected in the manufacturing stage comprise the processor type and memory size. The data sets collected in the user-scenario stage comprise the name and activation times of the window.

In one embodiment, during the training phase of the inference model, these data sets are input into a neural network to train the inference model.

In one embodiment, the part of the data sets collected in the development stage, the part collected in the manufacturing stage, and the part collected in the user-scenario stage are sequentially transmitted back to the server through the transmission interface.

In one embodiment, the desktop environment runs on the virtual machine.

In one embodiment, the desktop environment includes a desktop system and a distro. The default operating system receives a desktop system name and a distro name from the host operating system. The default operating system downloads the desktop system corresponding to the desktop system name and the distro corresponding to the distro name from the server.

In one embodiment, when the inference model determines through a state controller that a current default operating system deletion event and a new operating system deployment event have occurred, a monitoring device collects the processor type, memory size, and new desktop environment name when a new operating system is running, and regards the three as an environment combination, and increases an environment weight of the environment combination, the monitoring device collects a new window name, new window activation times and a new window type when running the new operating system, and regards the three as a user behavior combination, and increases a user behavior weight of the user behavior combination, readjusts the inference model through the environment weight and the user behavior weight, and generates a new inference model.

In one embodiment, a new desktop environment name output by the new inference model is transmitted to the state controller.

The operating system deployment device and the operating system deployment method shown in the present invention can be based on the input data through the inference model, and simultaneously consider the supportability of the hardware and the user type, so that the desktop environment name output by the inference model corresponds to the name of the desktop environment can provide users with a suitably smooth operating experience, and adaptively optimize the output results of the inference model.

BRIEF DESCRIPTION OF THE DRAWINGS

In order to describe the manner in which the content recited above and other advantages and features of the disclosure can be obtained, a more particular description of the principles briefly described above will be rendered by reference to specific examples which are illustrated in the appended drawings. It should be understood that these drawings depict only example aspects of the disclosure and are not therefore to be considered to be limiting of its scope. The principles herein are described and explained with additional specificity and detail through the use of the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
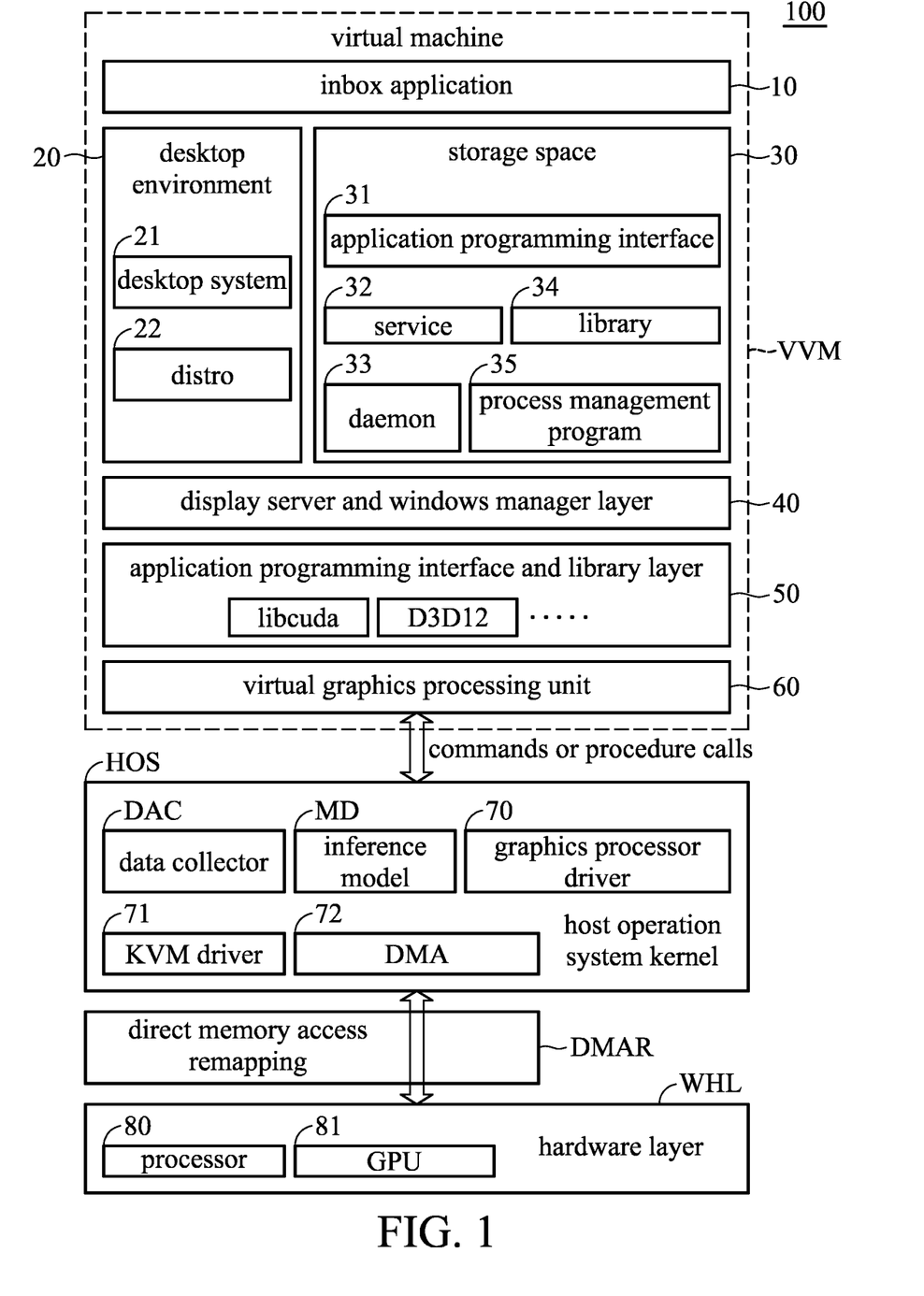
FIG. 1 is a block diagram of a operating system deployment device in accordance with one embodiment of the present disclosure.
Figure 2:
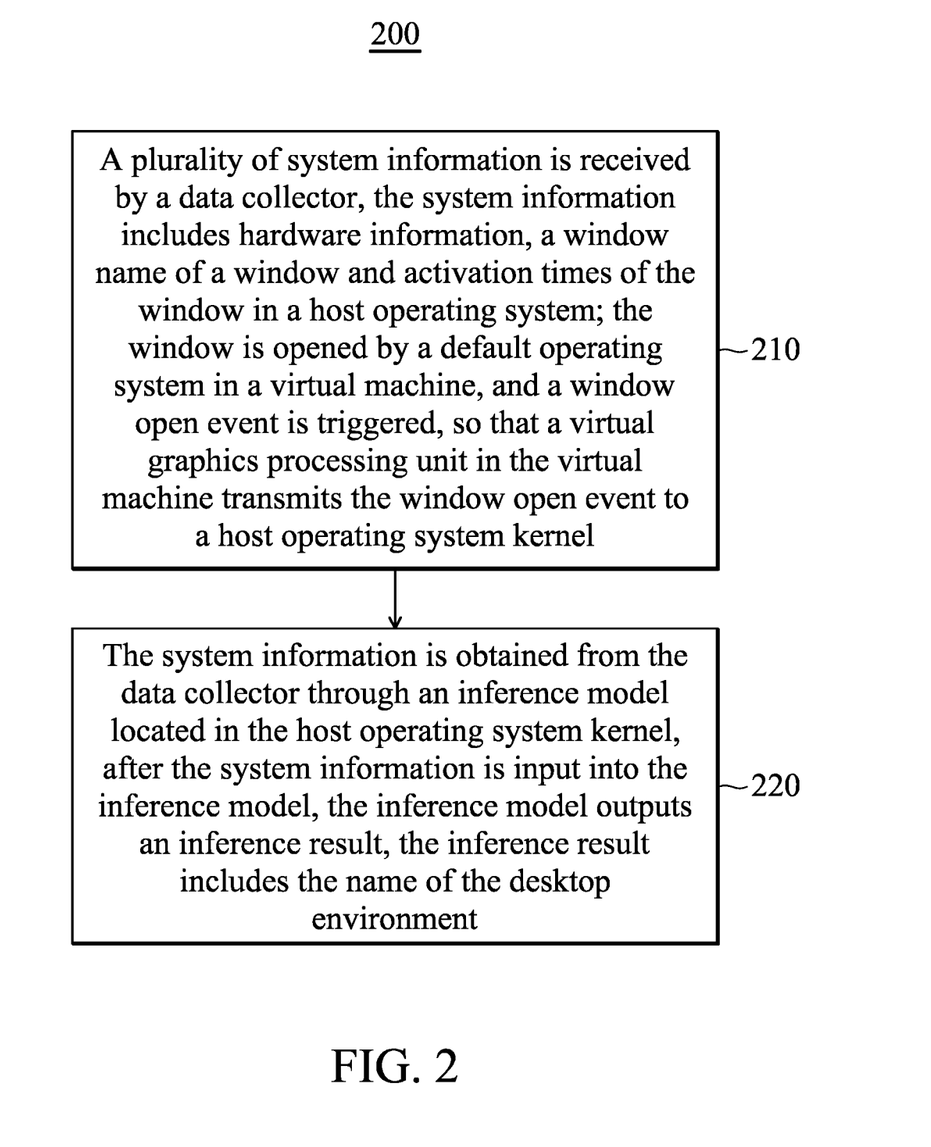
FIG. 2 is a flow chart of an operating system deployment method in accordance with one embodiment of the present disclosure.

Refer to FIG. 1 to FIG. 4, FIG. 1 is a block diagram of a operating system deployment device 100 in accordance with one embodiment of the present disclosure. The operating system deployment device 100 is suitable for a hybrid operating system. FIG. 2 is a flow chart of an operating system deployment method 200 in accordance with one embodiment of the present disclosure.

In one embodiment, the operating system deployment device 100 may be a notebook computer, a desktop computer, a tablet, a mobile phone or other electronic devices.

In one embodiment, the operating system deployment device 100 as shown in FIG. 1 includes a data collector DAC and an inference model MD. In one embodiment, the data collector DAC and the inference model MD are located in a host operating system kernel (Host OS Kernel) HOS.

In an embodiment, the operating system deployment method 200 can be implemented by the operating system deployment device 100 in FIG. 1.

In step 210, a plurality of system information is received by a data collector DAC, the system information includes hardware information, a window name of a window and activation times of the window in a host operating system. The window is opened by a default operating system in a virtual machine VVM, and a window open event is triggered, so that a virtual graphics processing unit 60 in the virtual machine VVM transmits the window open event to a host operating system kernel HOS.

In one embodiment, the default operating system is Windows, UNIX, Mac OS, Linux, for example. In one embodiment, the host operating system is, for example, Windows, UNIX, Mac OS, Linux, etc. For the convenience of description, the default operating system used in this this example is Linux (running on a virtual machine VVM), and the host operating system in this description is Windows (running on the host operating system kernel HOS). However, those skilled in the art should be able to understand that the operating systems run by the virtual machine VVM and the host operating system kernel HOS can be set according to the user's requirements.

In step 220, the system information is obtained from the data collector DAC through an inference model MD located in the host operating system kernel HOS. After the system information is input into the inference model MD, the inference model MD outputs an inference result. The inference result includes the name of the desktop environment 20.

In one embodiment, the desktop environment 20 runs on a virtual machine VVM.

In one embodiment, the desktop environment 20 includes a desktop system 21 and a distro 22. An application programming interface (API) 31, a service 32, a daemon 33, a library 34 and/or a process management program 35 corresponding to the desktop system 21 and the distro 22 are stored in a storage space 30.

In one embodiment, the storage space 30 may be created together with the creation of the virtual machine VVM. In one embodiment, there are two types of storage space: local and remote storage space, depending on where the virtual machine VVM executes. If the virtual machine VVM and its storage space 30 are located on the same host, it is called a local storage space. If remote storage is used, the performance of storage 30 may be affected by the speed of the cluster network interface.

In one embodiment, the inference model MD can also directly output the desktop system name of the desktop system 21 and the distro name of the distro 22.

In one embodiment, the inference model MD refers to the hardware device of the host to configure a suitable desktop system 21, and the inference model MD refers to the user's usage behavior to configure a suitable distro 22, and the desktop system 21 must be sufficient to run the distro 22 smoothly.

In one embodiment, in the Linux desktop environment, possible names for the desktop system 21 are, for example, GNOME, KDE, MATE, Cinnamon, XFCE, LXDE, LXQt, Deepin, Chrome, and the like. In one embodiment, the advantages and disadvantages of different desktop systems 21 are mainly related to the amount of temporary system resources. For example, when the desktop system 21 is GNOME, it requires more resources, but it also provides more functions and optimized interfaces. When the desktop system 21 is XFCE, LXDE, or LXQt, it requires fewer resources and can use on lower-end hardware devices.

In one embodiment, GNOME, KDE, MATE, Cinnamon, XFCE, LXDE, LXQt in the desktop system 21 can support the above distro 22. Deepin in desktop system 21 is classified into commercial and home versions, mainly used in China. Chrome in the desktop system 21 is mainly dedicated to Google's operating system.

In one embodiment, the update speed of the desktop system 21 is fast. Therefore, the data collector DAC needs to update the version information of various desktop systems 21 frequently, and pay attention to whether a new desktop system 21 is developed.

In one embodiment, the distro name of distro 22 is, for example, Fedora desktop suite, Ubuntu Studio, AVLinux, Apodio, io GNU/Linux, etc. For example, when user often engage in program development, so Ubuntu Studio is more suitable for this user.

In one embodiment, the distro 22 has a fast update speed, so the data collector DAC needs to update the version information of various distro 22 frequently, and pay attention to whether a new distro 22 is developed.

In one embodiment, it is assumed that the user chooses LXDE as the desktop system 21, and Ubuntu Studio as the distro 22. If the hardware performance of the host is low, it is likely to cause unsmooth operation, so the user must choose another distro 22 to try to run.

Since the hybrid operating system is constructed on a virtual environment, such as Windows WSL2 and CrosVM of Chrome OS, the hardware resources have been occupied by the virtual machine VVM, so a mechanism is required, which is suitable for the consumer group (i.e., users) and suitable for the current hardware specifications.

In one embodiment, the appropriate configuration of the desktop system 21 and the distro 22 can be obtained through the inference model MD, so as to achieve the effect of making the operating system deployment device 100 run smoothly and suitable for the user scenario. In one embodiment, the inference model MD is a trained model.

In one embodiment, after the desktop system 21 and the distro 22 are output from the inference model MD, the application programming interface 31, service 32, daemon 33, library 34 and/or process management program 35 corresponding to the desktop system 21 and distro 22 are also obtained and stored in the storage space 30.

In one embodiment, the data collector DAC can access the storage device through the network to obtain the application programming interface 31, service 32, daemon 33, library 34 and/or process corresponding to the desktop system 21 and distro 22 output by the inference model MD management program 35, as well as other information.

In one embodiment, the virtual machine VVM also includes following component. An inbox application 10 is configured to present a desktop interface corresponding to the desktop environment 20. A display server and windows manager layer 40 is the software of the window system for controlling the appearance and placement of windows. The application programming interface and library layer 50 is configured to store application programming interfaces, such as libcuda, D3D12, etc., and library. The virtual graphics processing unit 60 is configured to transfer, manage and monitor tools in real time, and transmit commands or procedure calls to the host operating system kernel HOS.

In one embodiment, from the host operating system kernel HOS and below are all components of the physical host.

In one embodiment, the host operating system kernel HOS includes: data collector DAC, inference model MD, graphics processor driver 70, keyboard, video and mouse driver (KVM driver) 71 and/or direct memory access (DMA) 72.

In one embodiment, direct memory access remapping (DMAR) is an input/output (I/O) virtualization technology designed by Intel to support virtual machines. The DMA address accessed by the I/O device is no longer the physical memory address, but must be translated by the direct memory access remapping DMAR hardware. The direct memory access remapping DMAR translates the DMA address into the physical memory address, and check access rights, etc.

In one embodiment, the hardware layer HWL includes a processor 80 and/or a graphics processing unit (GPU) 81. In one embodiment, the virtual graphics processing unit 60 can transmit instructions or program calls to the host operating system kernel HOS. The host operating system kernel HOS can selectively transmit instructions or program calls to the graphics processing unit 81 through direct memory access remapping DMAR. The commands or program calls required by the virtual graphics processing unit 60 are processed through the graphics processing unit 81.

In one embodiment, the processor 80 may also be implemented by a microcontroller, a microprocessor, a digital signal processor, an application-specific integrated circuit or a logic circuit, but is not limited thereto.

Figure 3:
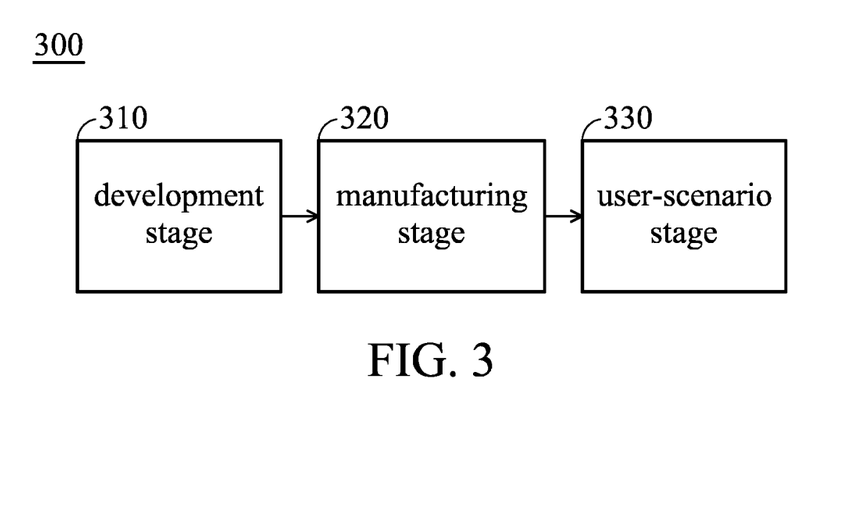
FIG. 3 is a schematic diagram of a method for collecting multiple data sets in accordance with one embodiment of the present disclosure.

Please refer to FIG. 3, FIG. 3 is a schematic diagram of a method 300 for collecting multiple data sets in accordance with one embodiment of the present disclosure. During the training stage of inference model MD, multiple data sets need to be collected, and these data sets are used as a training data set. In one embodiment, a data collector DAC is configured to collect these data sets.

The parts of these data sets collected at the development stage 310 include: the window name, a window category of the window name, the distro name, a distro category of the distro, and the desktop name.

In one embodiment, the window mentioned herein refers to a window that the developer presets that the user may open frequently during the development stage 310.

The parts of these data sets collected in the manufacturing stage 320 include processor type and memory size.

In an embodiment, the hardware layer HWL includes hardware such as the processor 80, memory, and graphics processing unit 81. In the manufacturing stage 320, the data collector DAC collects information about the hardware.

The part of these data sets that is collected in the user-scenario stage 330 includes the name and activation times of the window.

In one embodiment, the window mentioned herein refers to the window that the user often opens and the window-related data thereof collected by the data collector DAC during the user-scenario stage 330.

In one embodiment, in the training stage of the inference model MD, these data sets are input into a neural network to train the inference model MD.

Figure 4:
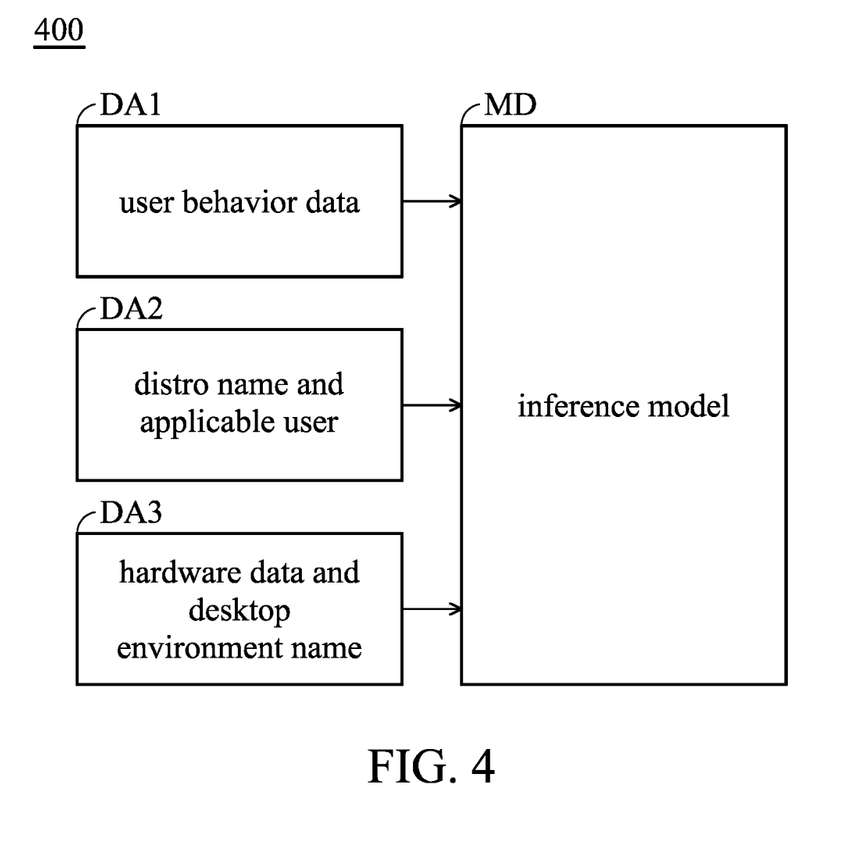
FIG. 4 is a schematic diagram of a method for training inference model in accordance with one embodiment of the present disclosure.

Please refer to FIG. 3 and FIG. 4 together. FIG. 4 is a schematic diagram of a method 400 for training inference model MD in accordance with one embodiment of the present disclosure. In the training stage of the inference model MD, multiple data sets are sorted and input into a class of neural networks to train the inference model MD.

In one embodiment, the neural network is, for example, a convolutional neural network (CNN), but it is not limited thereto, as long as it is a neural network capable of classifying data.

In one embodiment, the part of the data sets collected at the development stage 310, the part of the data sets collected at the manufacturing stage 320, and the part of the data sets collected at the user-scenario stage 330 are sequentially transmitted back to the server through the transmission interface. The server can organize and update these datasets in real time. For example, the server generates user behavior data DA1, distro name and applicable user DA2 (applicable user may refer to the user type of distro corresponding to the distro name) and/or hardware data and desktop environment name DA3, and return the user behavior data DA1, distro name and applicable user DA2 and/or hardware data and desktop environment name DA3 to the operating system deployment device 100, and input them into the inference model MD for training inference model MD.

In one embodiment, the user behavior data DA1 includes the window name, window activation times and/or user type name; the distro name and the applicable user DA2 includes the distro name and/or the applicable user type name; hardware data and desktop environment name DA3 includes the processor type, memory capacity, desktop environment name, processor usage and/or memory usage.

In FIG. 4, when the training of this type of neural network is completed, the trained neural network is the inference model MD.

The stopping condition for completing the training of this type of neural network may be completion of a predetermined epoch. Or, when the learning curve of this type of neural network is slowing down and the change in the slope of the learning curve is less than a predetermined value. However, the stopping conditions for the training of this type of neural network are not limited thereto, and can be adjusted according to actual applications.

Figure 5:
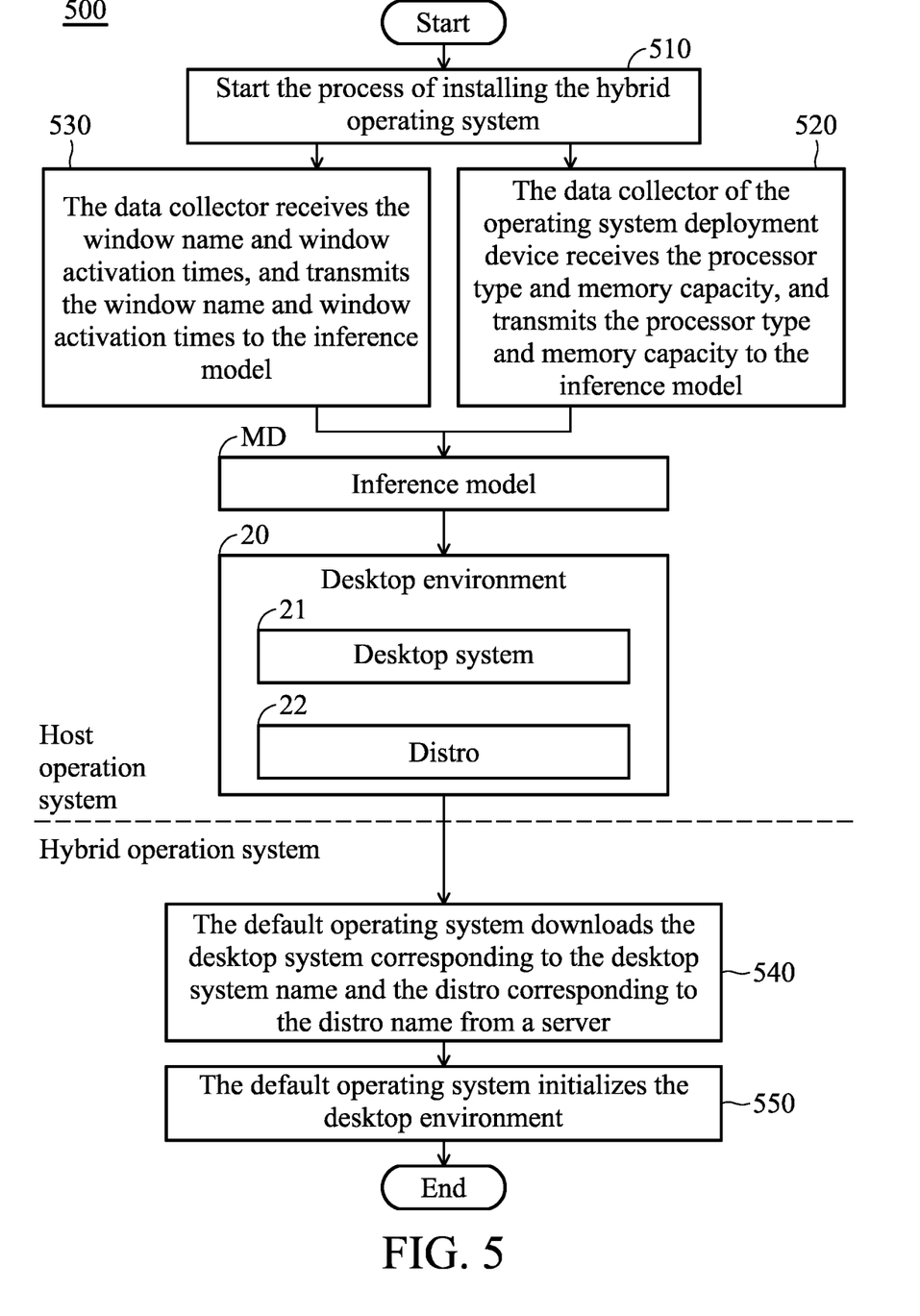
FIG. 5 is a schematic diagram of an operating system deployment method in accordance with one embodiment of the present disclosure.

Please refer to FIG. 5, which is a schematic diagram of an operating system deployment method 500 in accordance with one embodiment of the present disclosure. The inference model MD in FIG. 5 is the trained model.

In step 510, the operating system deployment device 100 starts the process of installing the hybrid operating system.

In step 520, the data collector DAC of the operating system deployment device 100 receives the processor type and memory capacity, and transmits the processor type and memory capacity to the inference model MD. By collecting the information of the hardware device, it is helpful to know the desktop system 21 that the operating system deployment device 100 can support.

In step 530, the data collector DAC of the operating system deployment device 100 receives the window name and window activation times, and transmits the window name and window activation times to the inference model MD.

In one embodiment, the window activation times refers to the number of times the opened window is opened in the host operating system.

In one embodiment, the user type can be known from the opened window. For example, a draftsman may open a graphic software (such as Photoshop) more often. A developer may often open video production software (video studio). E-sports players may spend a long time playing e-sports games. The window name can be obtained from the opened window. The operating system deployment device 100 will know which distro 22 is most suitable for this particular user.

In step 540, inference model MD outputs the desktop environment name, which is the name of the desktop environment 20.

In one embodiment, the desktop environment 20 includes a desktop system 21 and a distro 22. Since the inference model MD is located in the host operating system kernel HOS, the default operating system (for example, Linux running on a virtual machine VVM, which is also referred to herein as a hybrid operating system, or Hybrid OS) receives the name of the desktop system 21 and a distro 22 name from the host operating system (for example, Windows).

It can be seen from the above steps that the inference model MD has considered the hardware support ability and user type according to the input data. Therefore, the desktop environment 20 corresponding to the desktop environment name output by inference model MD can bring the user a suitable and smooth use experience.

In step 540, the default operating system downloads the desktop system 21 corresponding to the desktop system name and the distro 22 corresponding to the distro name from a server.

In one embodiment, the default operating system downloads the desktop system 21 corresponding to the desktop system name and the distro 22 corresponding to the distro name from the server through the transmission interface (e.g., a wireless network device) in the hardware layer HWL.

In step 550, the default operating system initializes the desktop environment 20.

In one embodiment, the default operating system deploys the downloaded desktop system 21 and distro 22.

Figure 6:
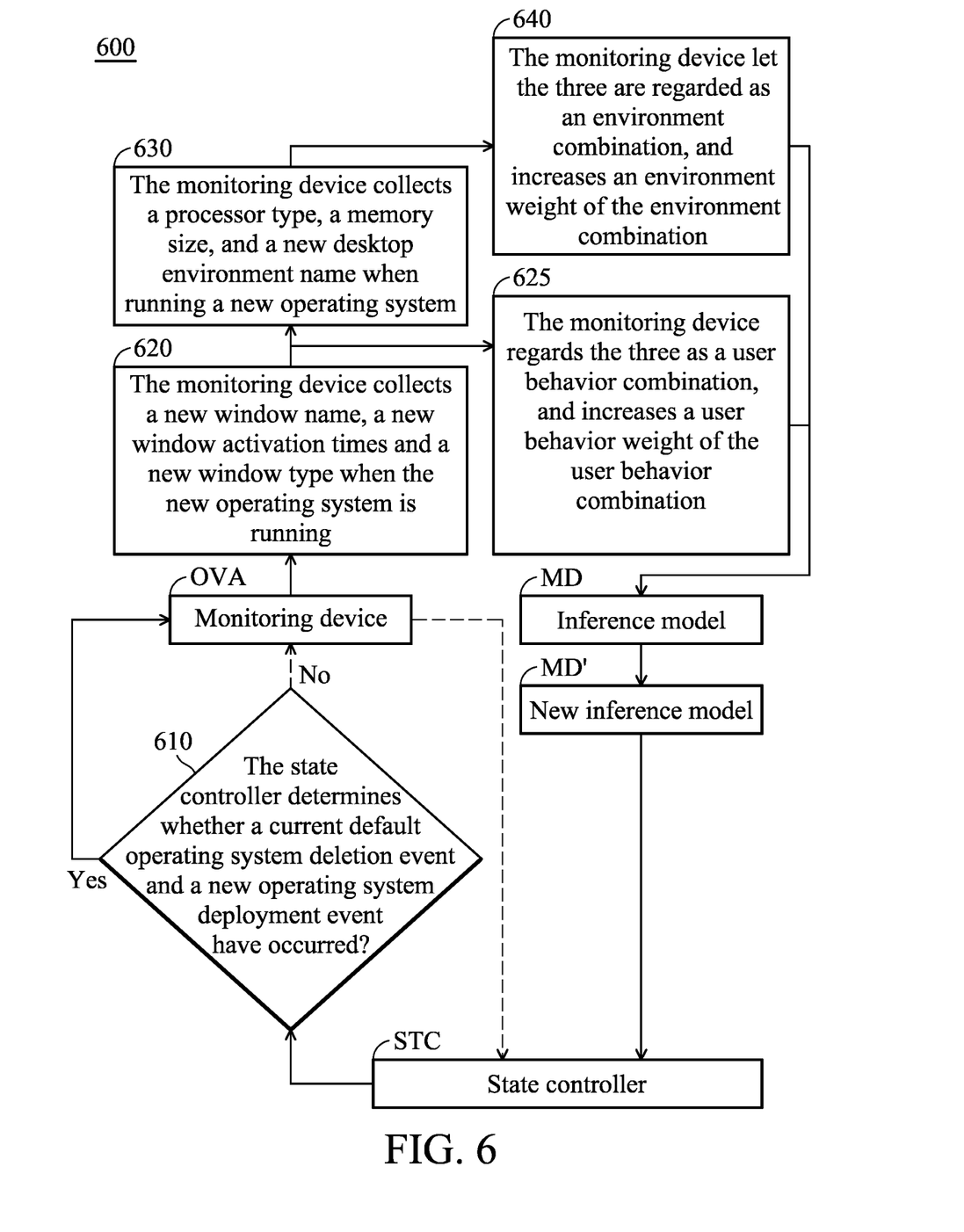
FIG. 6 is a schematic diagram of a method for optimizing inference model MD in accordance with one embodiment of the present disclosure.

Please also refer to FIG. 6, which is a schematic diagram of a method 600 for optimizing inference model MD in accordance with one embodiment of the present disclosure. The operating system deployment device 100 further includes a state controller STC and a monitoring device OVA.

In one embodiment, the state controller STC and the monitoring device OVA can be implemented by software, firmware, and hardware (e.g., chips, circuits).

In one embodiment, the state controller STC and the monitoring device OVA are located at the hardware layer HWL.

In one embodiment, the state controller STC and the monitoring device OVA can be connected to the direct memory access remapping DMAR.

In one embodiment, the state controller STC and the monitoring device OVA can be connected to the host operating system kernel HOS.

The dotted circle in FIG. 6 represents the normal operation of the operating system deployment device 10. In step 610, the state controller STC determines whether a current default operating system deletion event and a new operating system deployment event have occurred. If not, the state controller STC sends a normal message to the monitoring device OVA, and the monitoring device OVA returns a keep existing inference model message to the state controller STC.

The process of the solid line in FIG. 6 represents the state controller STC determining that a current default operating system deletion event and a new operating system deployment event have occurred. This situation may arise when the user thinks that the already deployed desktop system 21 and distro 22 are not suitable, or the user's behavior has changed. For example, drawing software was mainly used before, but now development software is mainly used, so the user deletes the current default operating system and/or deploys a new operating system.

In step 610, the state controller STC determines whether a current default operating system deletion event and a new operating system deployment event have occurred. If so, the state controller STC sends a data update message to the monitoring device OVA. The monitoring device OVA collects a processor type, a memory size, and a new desktop environment name when running a new operating system in step 630. In step 640, the monitoring device OVA let the three (the processor type, the memory size, and the new desktop environment name) are regarded as an environment combination, and increases an environment weight of the environment combination. On the other hand, in step 620, the monitoring device OVA collects a new window name, a new window activation times and a new window type when the new operating system is running. In step 625, the monitoring device OVA regards the three (the new window name, the new window activation times and the new window type) as a user behavior combination, and increases a user behavior weight of the user behavior combination, readjusts the inference model MD through the environment weight and the user behavior weight, and generates a new inference model MD'.

In one embodiment, a new desktop environment name output by the new inference model MD' is transmitted to the state controller STC.

Therefore, by increasing an environment weight of the environment combination and a user behavior weight of the user behavior combination, the probability of the new inference model MD' outputting the name of the new desktop environment can be increased, Therefore, by increasing an environment weight of the environment combination and a user behavior weight of the user behavior combination, the probability of the new inference model MD' outputting the name of the new desktop environment can be increased, in order to get the effect of adaptive optimization output results from new inference model MD'.

The operating system deployment device and the operating system deployment method shown in the present invention can make the desktop environment corresponding to the desktop environment name output by the inference model according to the input data and considering the hardware support and user type at the same time. The operating system deployment device and the operating system deployment method can bring users a suitable and smooth experience, and achieve the effect of adaptively optimizing the output results of the inference model.

The operating system deployment device and the operating system deployment method shown in the present invention can be based on the input data through the inference model, and simultaneously consider the supportability of the hardware and the user type, so that the desktop environment name output by the inference model corresponds to the name of the desktop environment can provide users with a suitably smooth operating experience, and adaptively optimize the output results of the inference model.

What is claimed is:

1. An operating system deployment device, suitable for a hybrid operating system, wherein the operating system deployment device comprises:
   processor;
   a data collector, configured to receive a plurality of system information, the system information including hardware information, a window name of a window and activation times of the window in a host operating system; wherein the window is opened by a default operating system in a virtual machine, and a window opening event is triggered, so that a virtual image processor in the virtual machine transmits the window opening event to a host operating system kernel; and
   an inference model, located in the host operating system kernel, and obtaining the system information from the data collector; wherein after the system information is input into the inference model, the inference model outputs an inference result;
   wherein the inference result includes a desktop environment name of a desktop environment;
   wherein the desktop environment comprises a desktop system and a distro, and an application programming interface (API), a service, a daemon, a library or a process management program corresponding to the desktop system and the distro are stored in a storage space,
   wherein the inference model is a trained model.

2. The operating system deployment device of claim 1, wherein during the training phase of the inference model, a plurality of data sets need to be collected, and these data sets are used as a training data set;
   wherein the data sets collected in a development stage comprise: the window name of the window, a window category of the window name, a distro name of a distro, a distro category of the distro, and a desktop name;
   wherein the data sets collected in a manufacturing stage comprise: a processor type and a memory size;
   wherein the data sets collected in a user-scenario stage comprise: the window name of the window, and the activation times of the window.

3. The operating system deployment device of claim 2, wherein during the training phase of the inference model, these data sets are input into a neural network to train the inference model.

4. The operating system deployment device of claim 2, wherein the part of the data sets collected in the development stage, the part collected in the manufacturing stage, and the part collected in the user-scenario stage are sequentially transmitted back to a server through a transmission interface.

5. The operating system deployment device of claim 2, wherein the desktop environment runs on the virtual machine.

6. The operating system deployment device of claim 1, wherein the desktop environment includes a desktop system and a distro;
   wherein the default operating system receives a desktop system name of the desktop system and a distro name of the distro from the host operating system, and downloads the desktop system corresponding to the desktop system name and the distro corresponding to the distro name from the server.

7. The operating system deployment device of claim 6, when the inference model determines through a state controller that a current default operating system deletion event and a new operating system deployment event have occurred, a monitoring device collects a processor type, a memory size, and a new desktop environment name when a new operating system is running, and regards the three as an environment combination, and increases an environment weight of the environment combination, the monitoring device collects a new window name, new window activation times and a new window type when running the new operating system, and regards the three as a user behavior combination, and increases a user behavior weight of the user behavior combination, readjusts the inference model through the environment weight and the user behavior weight, and generates a new inference model.

8. The operating system deployment device of claim 7, wherein a new desktop environment name output by the new inference model is transmitted to the state controller.

9. An operating system deployment method, suitable for a hybrid operating system, comprising:
   receiving a plurality of system information using a data collector, the system information includes hardware information, a window name of a window and activation times of the window in a host operating system; wherein the window is opened by a default operating system in a virtual machine, and a window opening event is triggered, so that a virtual image processor in the virtual machine transmits the window opening event to a host operating system kernel; and
   using the inference model to obtain the system information located in the host operating system kernel from the data collector; wherein after the system information is input into the inference model, the inference model outputs an inference result; wherein the inference result includes a desktop environment name of a desktop environment,
   wherein the desktop environment comprises a desktop system and a distro, and an application programming interface (API), a service, a daemon, a library or a process management program corresponding to the desktop system and the distro are stored in a storage space,
   wherein the inference model is a trained model.

10. The operating system deployment method of claim 9, wherein during the training phase of the inference model, a plurality of data sets need to be collected, and these data sets are used as a training data set;
    wherein the data sets collected in the development stage comprise: the window name of the window, a window category of the window name, a distro name of a distro, a distro category of the distro, and a desktop name;
    wherein the data sets collected in the manufacturing stage comprise processor type and memory size;
    wherein the data sets collected in the user-scenario stage comprise the window name of the window and the activation times of the window.

11. The operating system deployment method of claim 10, wherein during the training phase of the inference model, these data sets are input into a neural network to train the inference model.

12. The operating system deployment method of claim 10, wherein the part of the data sets collected in the development stage, the part collected in the manufacturing stage, and the part collected in the user-scenario stage are sequentially transmitted back to the server through a transmission interface.

13. The operating system deployment method of claim 10, wherein the desktop environment runs on the virtual machine.

14. The operating system deployment method of claim 9, wherein the desktop environment includes a desktop system and a distro;

wherein the default operating system receives a desktop system name of the desktop system and a distro name of the distro from the host operating system, and downloads the desktop system corresponding to the desktop system name and the distro corresponding to the distro name from the server.

15. The operating system deployment method of claim 14, when the inference model determines through a state controller that a current default operating system deletion event and a new operating system deployment event have occurred, a monitoring device collects the processor type, the memory size, and the new desktop environment name when the new operating system is running, and regards the three as an environment combination, and increases the environment weight of the environment combination, the monitoring device collects a new window name, new window activation times and a new window type when running the new operating system, and regards the three as a user behavior combination, and increases the user behavior weight of the user behavior combination, readjusts the inference model through the environment weight and the user behavior weight, and generates a new inference model.

16. The operating system deployment method of claim 15, wherein the new desktop environment name output by the new inference model is transmitted to the state controller.

\* \* \* \* \*